United States Patent [19]

Floyd

[11] Patent Number: 5,320,893
[45] Date of Patent: Jun. 14, 1994

[54] PRELAMINATE WITH A PARTIAL CUT TO PROTECT A SOLAR COATING FROM CORROSION

[75] Inventor: Brett W. Floyd, East Longmeadow, Mass.

[73] Assignee: Monsanto Company, St. Louis, Mo.

[21] Appl. No.: 999,350

[22] Filed: Dec. 31, 1992

[51] Int. Cl.$^5$ .................. B32B 3/02; B32B 3/10; B32B 17/10

[52] U.S. Cl. .................. 428/136; 428/912.2; 428/913; 428/437; 428/432; 428/430; 428/910; 428/192; 428/138; 428/220; 428/458; 428/34; 428/38; 428/337; 428/76; 428/77; 156/101; 156/107; 156/99

[58] Field of Search .................. 428/912.2, 913, 437, 428/432, 430, 910, 192, 138, 136, 220, 458, 34, 38, 337, 76, 77; 156/101, 107, 99

[56] References Cited

U.S. PATENT DOCUMENTS

| | | | |
|---|---|---|---|
| 2,209,435 | 7/1940 | Watkins et al. | 428/437 |
| 2,991,207 | 7/1961 | Miller | 156/99 |
| 3,764,445 | 10/1973 | Olson | 428/437 |
| 4,017,661 | 4/1977 | Gillery | 428/412 |
| 4,046,951 | 9/1977 | Stefanik | 428/192 |
| 4,234,654 | 11/1980 | Yatabe et al. | 428/333 |
| 4,565,719 | 1/1986 | Phillips et al. | 428/34 |
| 4,786,783 | 11/1988 | Woodard | 219/547 |
| 4,799,745 | 1/1989 | Meyer et al. | 350/1.7 |
| 5,019,258 | 5/1991 | Pierson | 210/258 |
| 5,024,895 | 6/1991 | Kavanagh et al. | 428/437 |
| 5,091,258 | 2/1992 | Moran | 428/437 |
| 5,131,967 | 7/1992 | Tweadey, II et al. | 156/101 |

FOREIGN PATENT DOCUMENTS 1230 2/1988 World Int. Prop. O. .

Primary Examiner—William Watkins, III
Attorney, Agent, or Firm—Michael J. Murphy; Mark F. Wachter

[57] ABSTRACT

A method of protecting a metal layer of a solar reflecting coating on a heat-shrinkable substrate, which are components of a prelaminate for a laminated window, from atmospheric corrosion. The prelaminate is cut partially through its thickness adjacent the edge and when the region of the cut is later exposed to elevated temperature, preferably during the laminating process forming the window, the substrate shrinks to create a channel into which flows plasticized polyvinyl butyral (PVB) to block the edge wall of the coating inward of the channel from the surrounding atmosphere.

6 Claims, 1 Drawing Sheet

PRELAMINATE WITH A PARTIAL CUT TO PROTECT A SOLAR COATING FROM CORROSION

BACKGROUND OF THE INVENTION

This invention relates to laminated windows and more particularly to such windows which include a solar reflecting coating.

Laminated windows containing glass and plasticized polyvinyl butryal (PVB) as a shock absorbing component for safety purposes are well known for architectural applications, vehicle windshields and the like. Layered transparent coatings containing one or more Angstrom-thick metal layers for reflecting heat-producing infra-red (IR) solar radiation are likewise known for use in such windows. The metal layer(s) may be electrically conducting to reduce defrost time particularly when the window is in a vehicle such as an automobile. As recognized in U.S. Pat. No. 5,131,967, windows containing such coatings have been known to experience corrosion after prolonged exposure along the edges to the atmospheric environment. Such corrosion usually starts at the peripheral edge of the coating which is not sealed from the environment. Over time, such corrosion may progressively extend inward from the edge and ultimately adversely affect coating appearance and performance.

A technique in the prior art minimizing such corrosion involves alloying a silver metal layer of the coating with gold (U.S. Pat. No. 4,234,654) or palladium (U.S. Pat. No. 4,565,719). These are quite expensive solutions.

SUMMARY OF THE INVENTION

Now, improvements have been made in laminated windows which include an infra-red (IR) reflective layered coating which mitigate shortcomings of the prior art.

Accordingly, a principal object of this invention is to improve the environmental stability of an IR reflective coating in a laminated window.

Another object is to improve the corrosion resistance of such a coating without relying on alloying or cladding with an expensive metal.

A specific object is to improve such corrosion resistance in a structure wherein the IR coating is encapsulated within layers containing plasticized PVB.

Other objects will in part be obvious and will in part appear from the following description and claims.

These and other objects are accomplished by providing a preliminate for a laminated window comprising a planar solar control film comprising a transparent, heat-shrinkable thermoplastic substrate layer bearing a transparent coating for reflecting solar radiation which includes one or more metal layers susceptible to atmospheric corrosion, and first and second layers containing plasticized polyvinyl butyral respectively bonded to the layered coating and thermoplastic substrate layer, such prelaminate containing a peripherally continuous cut adjacent its edge extending a preset depth in the thickness direction through both the first layer containing plasticized polyvinyl butyral and the coated substrate layer of the solar control film.

Also provided is a laminated window comprising two glass sheets, each bonded to a sheet containing plasticized polyvinyl butyral, a solar control film between and bonded to the sheets containing plasticized polyvinyl butyral, such film comprising a transparent, heat-shrinkable thermoplastic substrate layer bearing a transparent coating for reflecting solar radiation which includes one or more metal layers susceptible to atmospheric corrosion; such solar control film having a peripherally continuous channel formed therein adjacent its edge defined by opposing upright edge walls of the substrate layer and the coating, such channel containing plasticized polyvinyl butyral in sealing engagement with such opposing edge walls.

Further provided is a method of improving the resistance to atmospheric corrosion of a solar reflecting coating for a laminated window which comprises: a) providing a planar oriented prelaminate of two layers containing plasticized polyvinyl butyral encapsulating a solar control film which comprises a transparent, heat-shrinkable thermoplastic substrate layer bearing a coating for reflecting solar radiation containing one or more metal layers susceptible to atmospheric corrosion; b) cutting through the thickness around the periphery inward of the edge of the prelaminate to a preset depth which includes one layer containing plasticized polyvinyl butyral and the substrate layer and coating of the solar control film; c) exposing the cut prelaminate of b) to elevated temperature sufficient to i) shrink the thermoplastic substrate in the region of the cut in opposite directions thereby creating a channel and ii) cause plasticized polyvinyl butyral adjacent the cut to flow into the channel and block the edge wall of the coating inward of the channel from the surrounding atmosphere.

BRIEF DESCRIPTION OF THE DRAWING

In describing the overall invention, reference will be made to the accompanying drawing wherein.

DETAILED DESCRIPTION OF PREFERRED EMBODIMENTS

Figure 1:
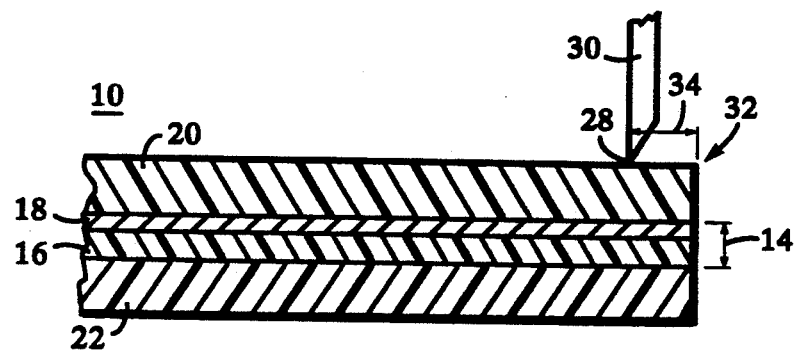
FIG. 1 is a fragmentary sectional view of a prelaminate prior to modification according to the invention.
Figures 3, 4:
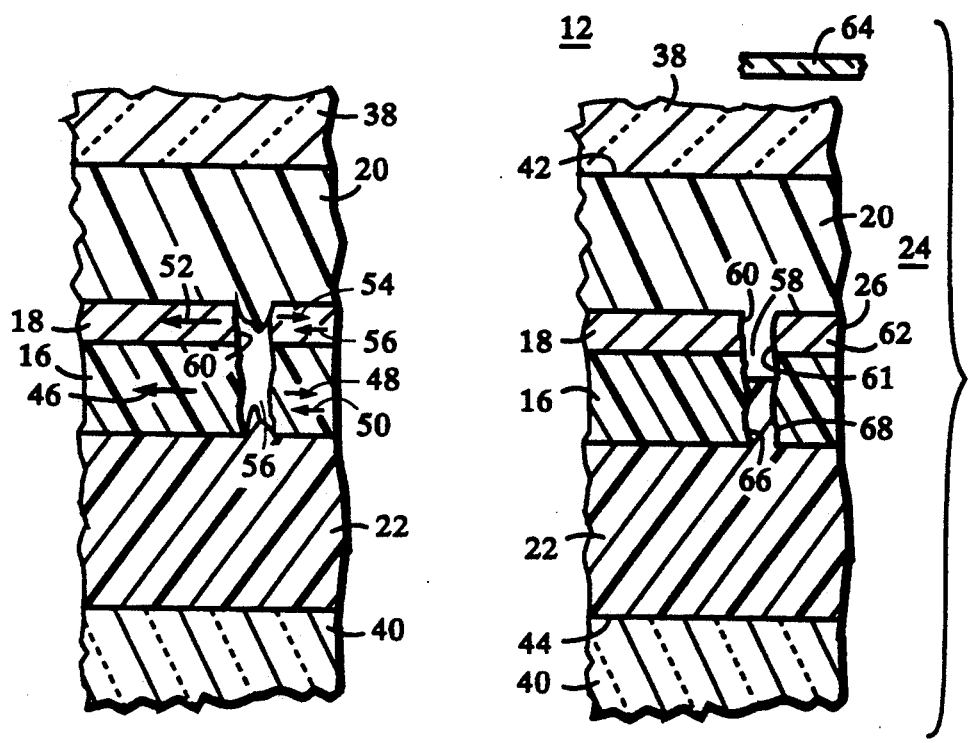
FIG. 3 is a view similar to FIG. 1 in enlarged detail schematically showing an aspect of the invention.
FIG. 4 is a view similar to FIG. 1 of a laminated window according to the invention.

Referring to the drawings, prelaminate 10 in FIG. 1 is for use in laminated window 12 (FIG. 4). Prelaminate 10 comprises planar solar control film 14 which includes transparent, dimensionally heat-shrinkable thermoplastic substrate layer 16, typically of polyester plastic, e.g. polyethylene terephthalate or a material having like shrink characteristics, bearing transparent coating 18 for reflecting solar radiation. Coating 18 includes one or more, typically two, metal layers susceptible to atmospheric corrosion. Coating 18 is a multi-layer stack reflecting IR radiation and transmitting visible light when exposed to daylight in a safety glazing such as laminated window 12. Coating 18 is known (see, for example, International Publication WO88/01230 and U.S. Pat. No. 4,799,745, the content of which are incorporated herein by reference) and comprises one or more Angstrom thick metal layers and one or more sequentially deposited optically cooperating dielectric layers. As also known, (see, for example, U.S. Pat. Nos. 4,017,661 and 4,786,783, the content of which are also incorporated herein by reference), though not shown, the metal layer(s) may optionally be electrically resistance heated through association with a conductive connecting member(s) for defrosting or defogging of glass layers in the laminated window.

In addition to coating 18, one or more additional coatings, not shown, may optionally be present to provide additional functional features in the prelaminate and subsequent window.

Substrate layer 16 is typically a film having a thickness of about 0.5 to 8 mils (0.013 to 0.20 mm), preferably 1 to 4 mils (0.025 to 0.1 mm) and most preferably 2 mils (0.05 mm). Prior to deposition of coating 18, layer 16 may be optionally initially surface treated or coated to improve one or more properties such as adhesion.

First 20 and second 22 layers of prelaminate 10 contain plasticized polyvinyl butyral (PVB) and are respectfully bonded to layered coating 18 and thermoplastic layer 16 of prelaminate 10. Layers 20 and 22 are flexible and transparent and are typically about 5 to 30 mils (0.13 to 0.76 mm) thick. Layers 20, 22 may be of the same or different thickness, preferably the same, and are commercially available from Monsanto Company as Saflex ® sheet.

Solar control film 14 is commercially available from Southwall Technologies Inc. of Palo Alto, Calif. as HEAT MIRROR TM-XIR-70-2 film. The substrate layer is 2 mil (0,051 mm) thick polyethylene terephthalate (PET) film from Hoechst Celanese Corp. as HOSTAPHAN ® 4400-200 film which is oriented, i.e. biaxially oriented by stretching approximately equally in the longitudinal and transverse directions in the plane of the film. The coating is about 2000 A thick and comprises 5 to 7 successive, sputter-deposited alternate layers of silver metal and indium oxide dielectric material, further details of which are in U.S. Pat. No. 4,799,745. The side of PET substrate layer 16 without coating 18 is plasma treated, typically using oxygen, to improve the adhesive strength to PVB layer 22. As disclosed in U.S. Pat. No. 5,091,258, FIG. 2, the content of which is incorporated herein by reference, solar control film 14 is encapsulated within and lightly bonded to PVB layers 20, 22 in the nip of a pair of oppositely rotating cooperating press rolls. In one embodiment, indium oxide dielectric material of coating 18 abuts and is bonded to first layer 20 containing plasticized PVB. Prelaminate 10 is usually in roll form from which are cut individual sections to form laminated window 12 in a manner to be further described.

The corrosion of concern involves air-borne moisture, typically containing chloride and sulfide ions, in the atmospheric environment illustratively referred to in FIG. 4 as 24 which are thought to deposit along edge 26 of laminated window 12. Window 12 typically is the front windshield of a motor vehicle or the transparent covering over the opening in a wall of a building. Edge 26 is usually not hermetically sealed from and, at least to some extent, is open to environment 24. During the useful life of laminated window 12, such ions slowly advance inward of edge 26 along the interface of the solar coating with the abutting layer 20 containing PVB. A chemical reaction with the metal layer(s), for example silver reacting with chloride or oxygen, is thought to cause the corrosion.

Figure 2:
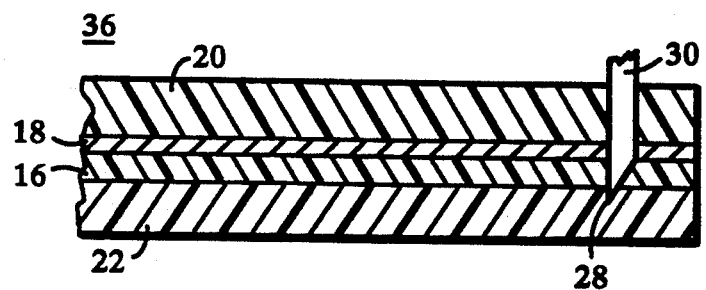
FIG. 2 is a view similar to FIG. 1 showing a step in the process of the invention.

In accordance with the invention, with prelaminate 10 typically supported on a resilient surface, not shown, edge 28 of downwardly directed blade 30 is forced by a suitable conventional reciprocating means, not shown, into prelaminate 10 to cut through its thickness around the full periphery inward of edge 32 (FIG. 1) to a preset depth which includes first layer 20 containing plasticized PVB, substrate layer 16 and coating 18 of solar control film 14. The preferred depth of this cut through prelaminate 10 is illustrated in FIG. 2 and must include the three thicknesses just recited. Partial penetration into the thickness of second layer 22 containing plasticized PVB is not deleterious and preferable to insure consistently penetrating through the entire thickness of heat shrinkable carrier layer 14 in a high speed, commercial scale stamping installation. On the other hand, the blade cannot cut through the full thickness of second layer 22 since this would negate the subsequent blocking behavior of the PVB in a manner to be described. The cut just described must be continuous around the entire periphery and should be as close as feasible to edge 32 of prelaminate 10. To provide tolerance for error in cut placement, it is usually set (34 in FIG. 1) about 0.125 to 0.250 inch (0.3–0.6 cm) inward of edge 32. In the embodiment shown when the blade is removed immediately after cutting the opposing surfaces of the cut layers usually remain butted together—i.e. no gap exists between such cut surfaces. The details of the cutting element are not critical. Any type of sharp edge 28 capable of penetrating the desired thickness of prelaminate 10 is adequate. Edge 28 may be planar or serrated to provide a cut of different levels in second layer 22, or any combination thereof. A laser beam or the like with appropriate controls may be used to terminate the cut at the desired depth. A preferred form of cutting element is a double edge rule die wherein another cutting blade, not shown, spaced outwardly and integral with blade 30 operated by the same reciprocating mechanism is present, with its cutting edge vertically below edge 28. With this arrangement the latter blade passes entirely through modified prelaminate 36 leaving edge 32 in, for example, cutting a section of prelaminate out of an unwound lap of a bulk supply roll while blade 30, according to the invention (FIG. 2) cuts partially through the thickness.

Accordingly, modified prelaminate 36 in FIG. 2 contains a peripherally continuous cut adjacent its edge extending a preset depth in the thickness direction through both first layer 20 containing plasticized polyvinyl butyral and the coated substrate layer of solar control film 14.

Modified prelaminate 36 is next conventionally assembled with glass layers 38,40 (FIG. 4), then deaired, preferably edge sealed to the glass and then firmly bonded along the glass/PVB interfaces 42,44 (FIG. 4) at elevated temperature and pressure, usually as provided in an autoclave enclosure. Heat associated with such laminating causes the plastic in the region of the cut in prelaminate 36 to behave in such a manner as to protect the solar coating inward of the cut from atmospheric corrosion. More particularly, prelaminate 36 is placed between 75–125 mils (2-3 mm) thick layers 38,40 of glass to form a three layer laminate of glass/prelaminate/glass. An elastomeric vacuum ring is typically placed in sealing contact with the perimeter of such three layer laminate. Negative pressure within the ring is reduced to 600 mm Hg and held for 5 minutes at ambient temperature to withdraw air from the glass/PVB interfaces formed by channels through toughened exterior deairing surfaces of each PVB layer. The deaired three layer laminate and functioning vacuum ring are placed in an oven at 85° C. for about 25 min. to seal the laminate edges to the glass. After removing the vacuum ring, the assembly is held in an autoclave for about 2 hours at 1275 kPa, 150° C. to firmly bond PVB layers 20, 22 to glass layers 38, 40 and form laminated window 12 of FIG. 4.

In accordance with the invention, when the modified prelaminate 36 cut adjacent its periphery in the manner previously described is exposed to elevated temperature during edge sealing and particularly during the glass bonding step, the full thickness of heat shrinkable polyester substrate 16 in the region of the cut shrinks and retracts in opposite directions as schematically depicted by arrows 46, 48 and 50 in FIG. 3. Since adhered to substrate 16, coating 18 moves with the substrate (arrows 52, 54, 56). This shrinkage creates channel 56 in solar control film 14 which is open at each end (in the vertical direction) into which hot, viscous plasticized PVB (58 in FIG. 4) simultaneously flows under the influence of the elevated pressure in the autoclave to fill the channel and thereby block edge wall 60 of coating 18 inward of channel 56 from surrounding atmosphere 24. If the amount of prior stretching of substrate layer 16 is not equal in each planar direction, the dimensional extent of shrink back of layer 16 will vary somewhat. The PVB flows under such elevated temperature laminating conditions and the edge surfaces of the cut in the PVB layers fuse together and disappear leaving no visual trace of the prior cut. Channel 56 delimited in the vertical direction by opposing edge walls 66, 68 (FIG. 4) of substrate 14 and 60, 61 of coating 18 can vary in the width direction (perpendicular to such edge walls). To function in the manner described such width is at least 0.0005 inch and preferably 0.0016 to 0.004 inch.

Edge wall 60 (FIG. 4) of coating 18 is blocked or shielded from surrounding environment 24 by minute block or bead formation 58 (after the plastic cools and solidifies) of plasticized PVB. As long as channel 56 is uninterrupted around the full periphery, there is no possibility that the coating inward of edge wall 60, which represents the major planar expanse in the window, will be degraded by corrosion from coating border 62. Thus, corrosion propagation inward of the prior cut in the prelaminate is effectively stopped or blocked by the fail-safe use of plasticized PVB as an edge sealant in the manner described. The importance of initially cutting through the entire thickness of the substrate layer around the full periphery of the prelaminate is apparent to avoid corrosion "leaking" into the interior of the coating through any continuity that might otherwise be left. The coating inward of border 62, therefore, represents a corrosion-protected solar radiation reflecting coating segregated by plasticized PVB bead 58 from unprotected coating border 62. Since border 62 will be exposed to environment 24 it will corrode and progressively surface-whiten with time. When the cut through the thickness is relatively even in distance inward of the edge, this white border around the periphery of the window may be aesthetic and decorative and left exposed, depending on the application. Usually, however, a cover 64 (FIG. 4) over border 62 is used around the periphery of window 12 to mask and conceal from view peripheral border 62 of the coating outward of channel 56. A black ceramic band has been used as cover 64. When cover 64 is used, the precision of the distance 34 (FIG. 1) of cut inward of the edge of the prelaminate need not be as closely controlled and can be increased to facilitate efficiency in a high speed commercial operation, in comparison with not using a covering and leaving border 62 exposed.

Laminated window 12 illustrated in FIG. 4 includes a solar control film 14 having a peripherally continuous, enclosed channel 58 formed therein adjacent its edge defined by opposing upright edge walls 66, 68 of substrate layer 14 and 60, 61 of coating 18, such channel containing plasticized PVB in sealing engagement with such opposing edge walls.

It is preferred, in order to optimize optical properties in the laminated window, that the temperature to shrink the substrate layer and create the channel for the plasticized PVB be provided during prelaminate edge sealing and glass laminating as described. Such glass laminating conditions usually are about 130° to 140° C. and about 1125 to 1140 kPa. Though not preferred, it may be possible to achieve the desired corrosionprotection by subjecting the cut prelaminate to a separate heat treating step prior to assembly with glass.

The preceding description is for illustration and should not to be taken as limiting. Various modifications and alterations will be readily suggested to persons skilled in the art. It is intended, therefore, that the foregoing be considered as exemplary only and that the scope of the invention be ascertained from the following claims.

I claim:

1. A prelaminate for a laminated window comprising:
    a planar solar control film comprising a transparent, heat-shrinkable thermoplastic substrate layer bearing a transparent coating for reflecting solar radiation which includes one or more metal layers susceptible to atmospheric corrosion;
    first and second layers containing plasticized polyvinyl butyral respectively bonded to the layered coating and thermoplastic substrate layer;
    said prelaminate containing a peripherally continuous partial cut adjacent its edge extending in the thickness direction at least through both the first layer containing plasticized polyvinyl butyryl and the coated substrate layer of the solar control film.

2. The prelaminate of claim 1 wherein the cut extends partially through the second layer containing plasticized polyvinyl butyral.

3. The prelaminate of claim 2 wherein the cut is about 0.125 to 0.250 inch inward of the edge of the prelaminate.

4. The prelaminate of claim 3 wherein the substrate layer is polyester.

5. The prelaminate of claim 4 wherein the substrate layer comprises polyethylene terephthalate.

6. A prelaminate of oriented polyethylene terephthalate coated with a layered stack including at least one metal layer, encapsulated on each side with a layer containing plasticized polyvinyl butyral, said prelaminate adjacent the edge being peripherally continuously cut partially through its thickness which at least includes the polyethylene terephthalate, the stack and a layer containing plasticized polyvinyl butyryl.

* * * * *